250/203

United States Patent [19]

Ahlbom et al.

[11] 3,829,614

[45] Aug. 13, 1974

[54] AUTOMATIC VIDEO CONTRAST TRACKER

[75] Inventors: Sten H. Ahlbom, Saltsjo-Boo; Sture J. H. Hansson, Hagersten, both of Sweden

[73] Assignee: Saab-Scania Aktiebolag, Linkoping, Sweden

[22] Filed: Jan. 22, 1973

[21] Appl. No.: 325,814

Related U.S. Application Data

[63] Continuation-in-part of Ser. No. 114,498, Feb. 11, 1971, abandoned.

[30] Foreign Application Priority Data

Feb. 11, 1970 Sweden .............................. 1747/70

[52] U.S. Cl...... 178/6.8, 178/DIG. 20, 178/DIG. 21, 250/203 CT

[51] Int. Cl. ............................................ H04n 7/18

[58] Field of Search....... 178/6.8, DIG. 20, DIG. 21; 250/203 CT

[56] References Cited

UNITED STATES PATENTS

| | | | |
|---|---|---|---|
| 3,039,002 | 6/1962 | Guerth | 178/DIG. 21 |
| 3,211,898 | 10/1965 | Fomenko | 343/5 MM |
| 3,257,505 | 6/1966 | Van Wechel | 178/6.8 |
| 3,341,653 | 9/1967 | Kruse | 178/6.8 |
| 3,412,397 | 11/1968 | Evans | 343/5 |
| 3,707,598 | 12/1972 | Scarborough | 178/6.8 |

*Primary Examiner*—Howard W. Britton
*Assistant Examiner*—Michael A. Masinick

[57] ABSTRACT

In a video tracker, each scan line is broken into a predetermined number of uniform short segments. An electronic tracking window thus comprises a matrix of data points, each a line segment, and its edges are on coordinates defined by data points. Video signal content of each line segment in the window area is digitized by comparison to automatically adjustable reference level signals and generation of either a "one" or a "zero" bit, depending upon relationship of video signal content to reference levels. For each frame scanned, data points in the window are compored, set by set, with a bit pattern preselected for best correspondence to target configuration, comparisons being made sequentially across and down the window. A correlation number is obtained for each comparison. Location and value of the highest correlation number for each scan is stored and used for tracking.

4 Claims, 11 Drawing Figures

AUTOMATIC VIDEO CONTRAST TRACKER

This application is a continuation-in-part of our copending application Ser. No. 114,498, filed Feb. 11, 1971, now abandoned.

This invention relates to a method and means for automatic video contrast tracking, whereby the image of a moving object that is presented on a television screen or the like, and which object image is of limited area and has substantial contrast with its background, can be tracked to cause a T.V. camera or the like to lock on and follow the object, or to provide data from which calculations can be made concerning the movements of the object.

Apparatus of the type with which the present invention is concerned can be used for controlling the descent path of a landing aircraft, guiding a missile, or guiding a data processing system used for controlling or monitoring a moving vehicle, missile or the like. Such apparatus comprises an electro-optical sensor, and utilizes and processes the video signal from it to produce a signal that represents the location of a selected contrast area relative to a fixed point, which point can be the optical axis of the electro-optical sensor. Thus the tracking device can be regarded as a kind of angle measuring instrument that gives information concerning the deviation between, for example, the optical axis of a T.V. camera and a selected target which is within the field of view of the camera, and which target can be an area of contrast within the scene or field of view upon which the camera is trained. Since the shape or pattern of the contrast area is of significance in selection and tracking of the target, the method and apparatus used in tracking on the contrast area involves applications of image analysis and requires the attainment of at least simpler forms of pattern recognition.

The present invention relates in part to a relatively simple but very accurate method and apparatus for achieving target identification and automatic tracking of areas of image contrast occupying a portion of the field of view of a T.V. camera.

Thus it is an object of the present invention to provide a contrast tracking device which has a high degree of discrimination as well as high tracking accuracy, and which, more specifically, can track upon an image area of selected configuration, even though such image area is of such small size as corresponds to the width of only a few scan lines on a T.V. image screen, and even though the total image field includes numerous other areas of contrast.

It is also an object of the present invention to provide a method and means for automatic video contrast tracking that employs digital techniques so that apparatus embodying the invention can be connected with a central programming unit which can guide its functional cycles. However, the method and apparatus are herein described with reference to integrated equipment in which the necessary guidance functions are performed by apparatus comprising a part of the tracking mechanism itself.

Further objects of the invention include the provision of a tracking system of the character described having equally good tracking capabilities both parallel to and transverse to the scan lines of the raster; wherein error signals are independent of the form and signal level of the target; and wherein target discrimination sensitivity can be automatically adjusted to the prevailing level of contrast between the target and its background.

With these observations and objectives in mind, the manner in which the invention achieves its purpose will be appreciated from the following description and the accompanying drawings, which exemplify the invention, it being understood that changes may be made in the precise method and means of practicing the invention and in the specific apparatus disclosed herein without departing from the essentials of the invention set forth in the appended claims.

The accompanying drawings illustrate several complete examples of embodiments of the invention constructed according to the best modes so far devised for the practical application of the principles thereof, and in which.

Figure 1:
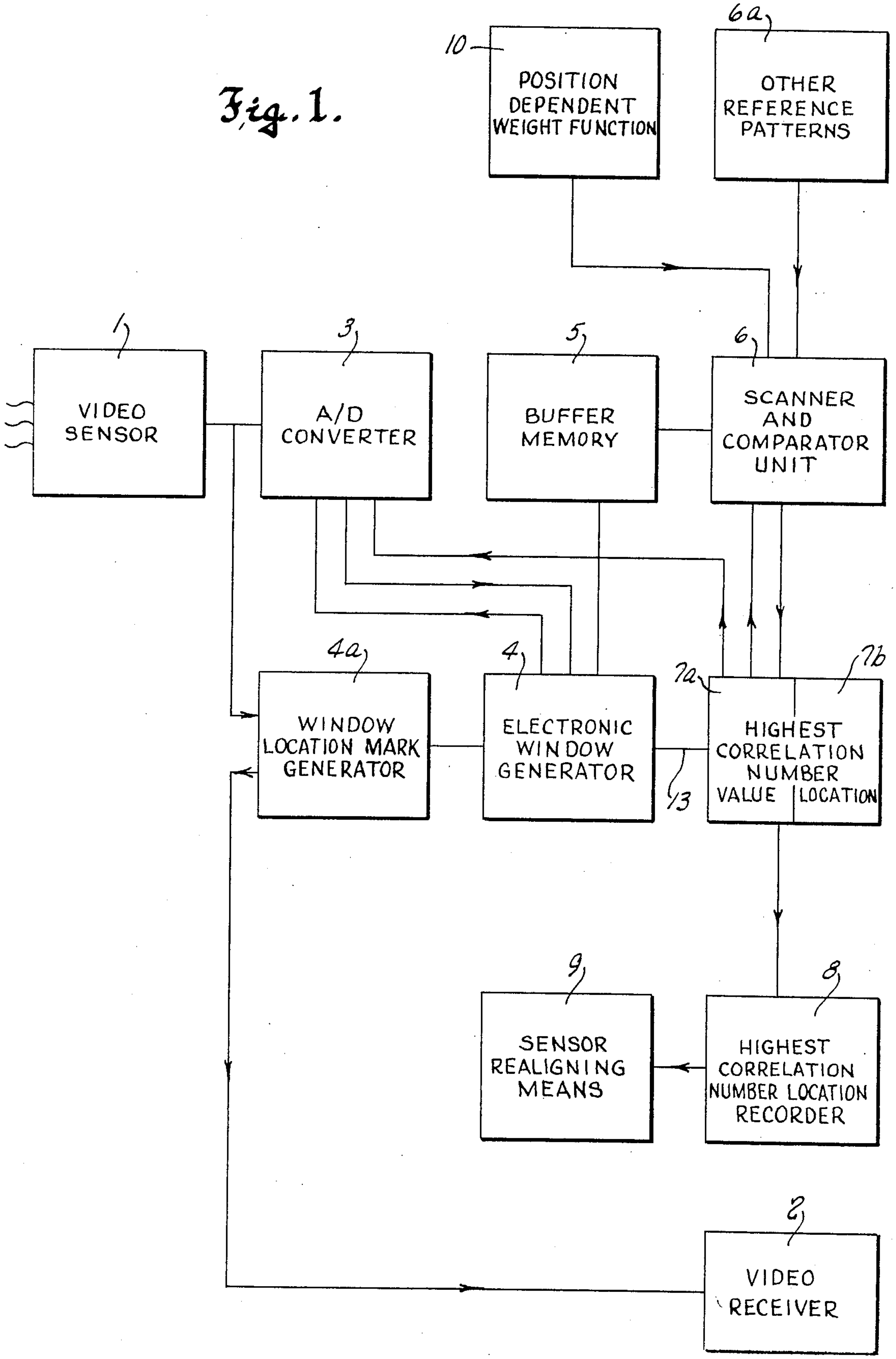
FIG. 1 is a generalized block diagram showing the main units or blocks of an automatic contrast tracker embodying the method and apparatus of this invention.
Figures 3A, 3B, 3C, 3D:
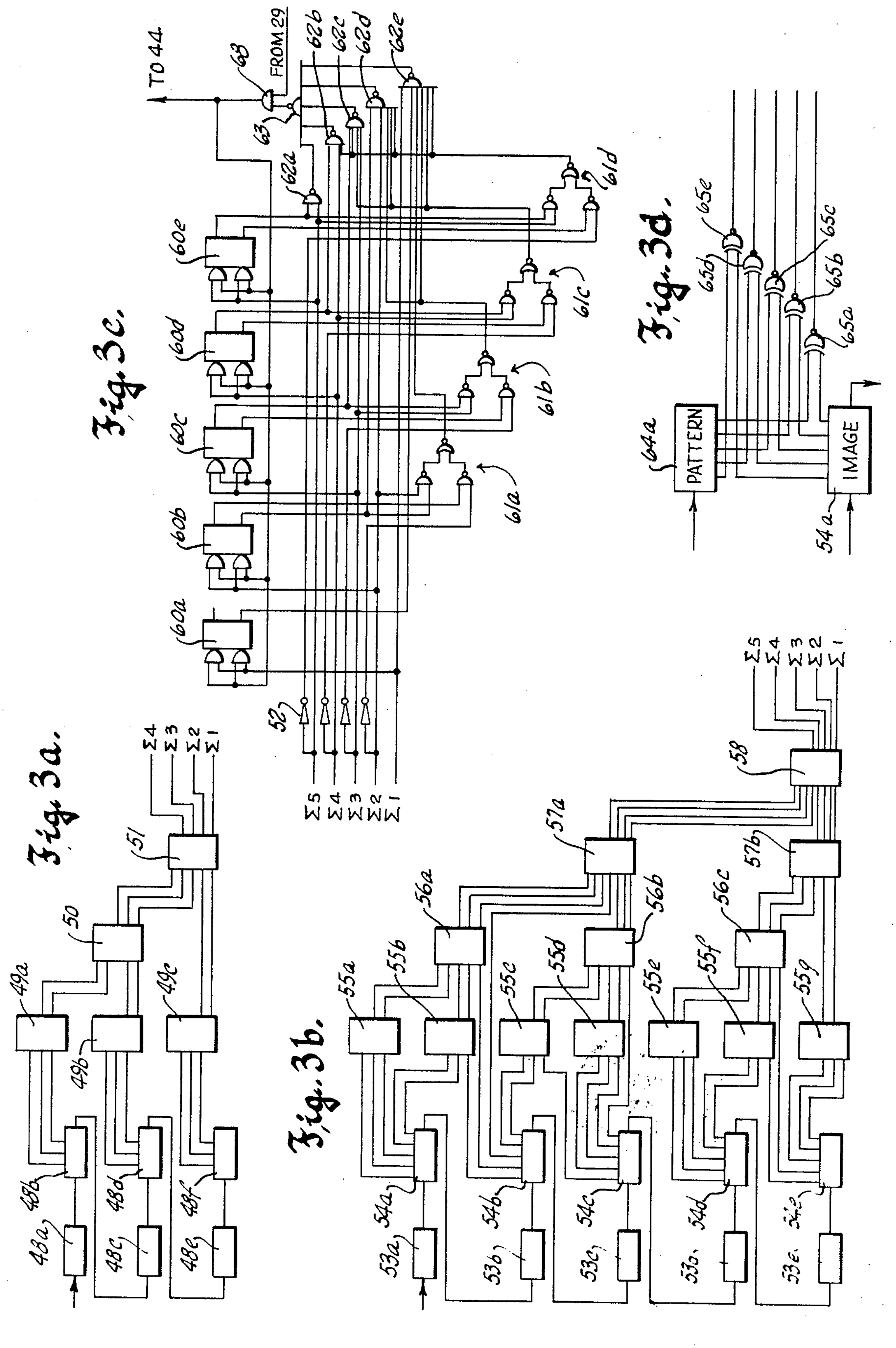
Figure 4:
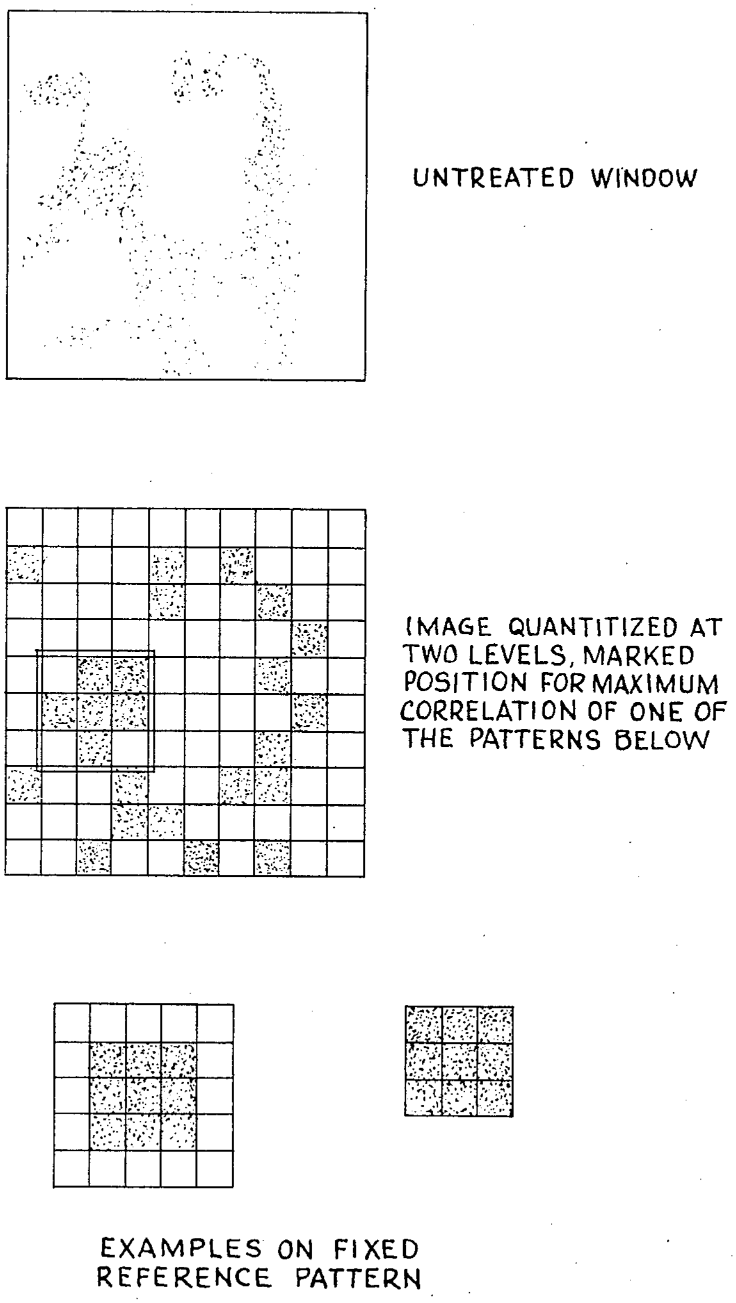
Figure 5:
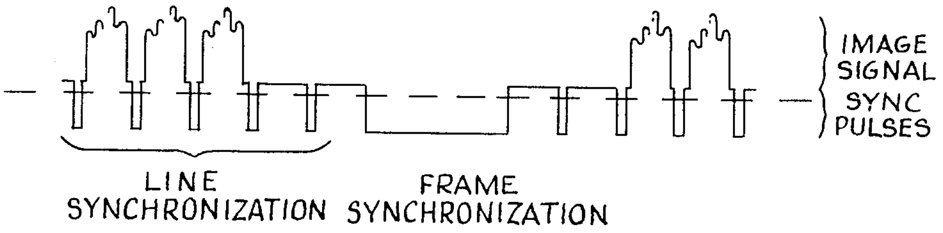
Figure 6:
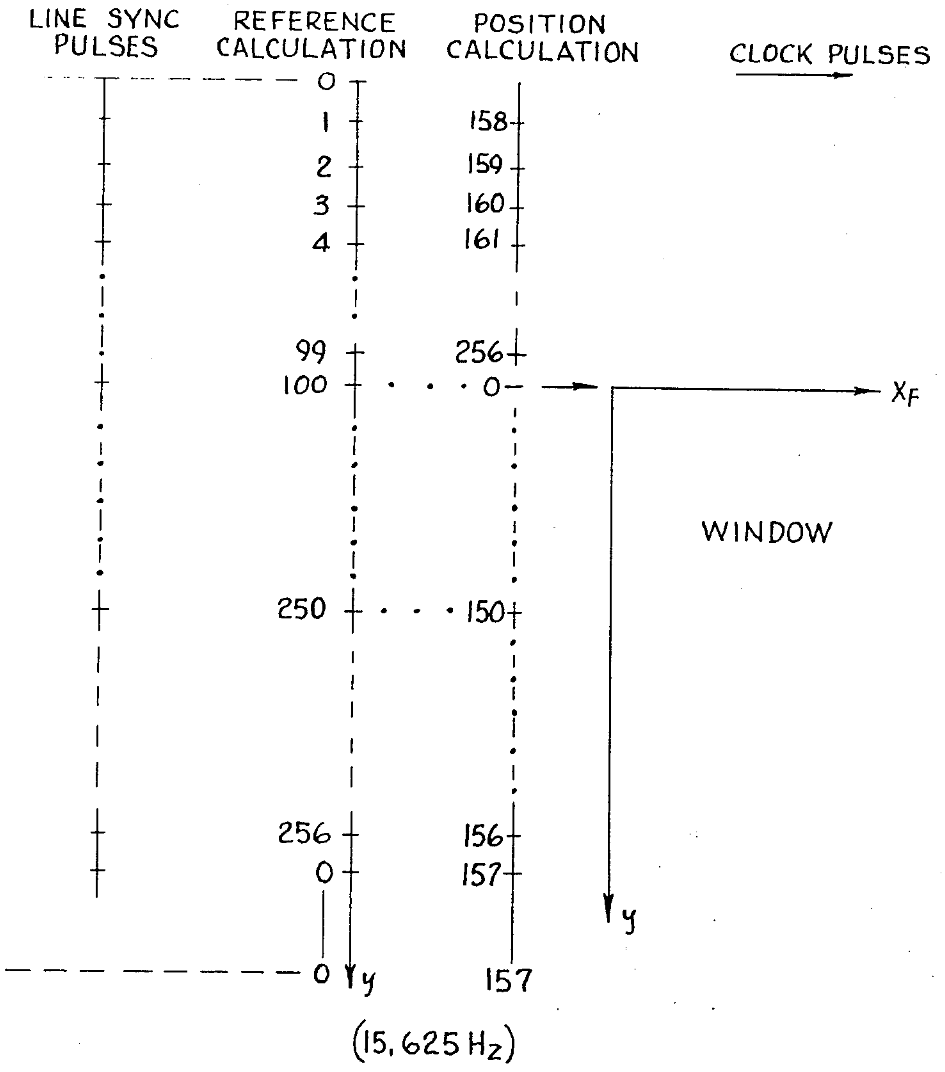
Figure 7:
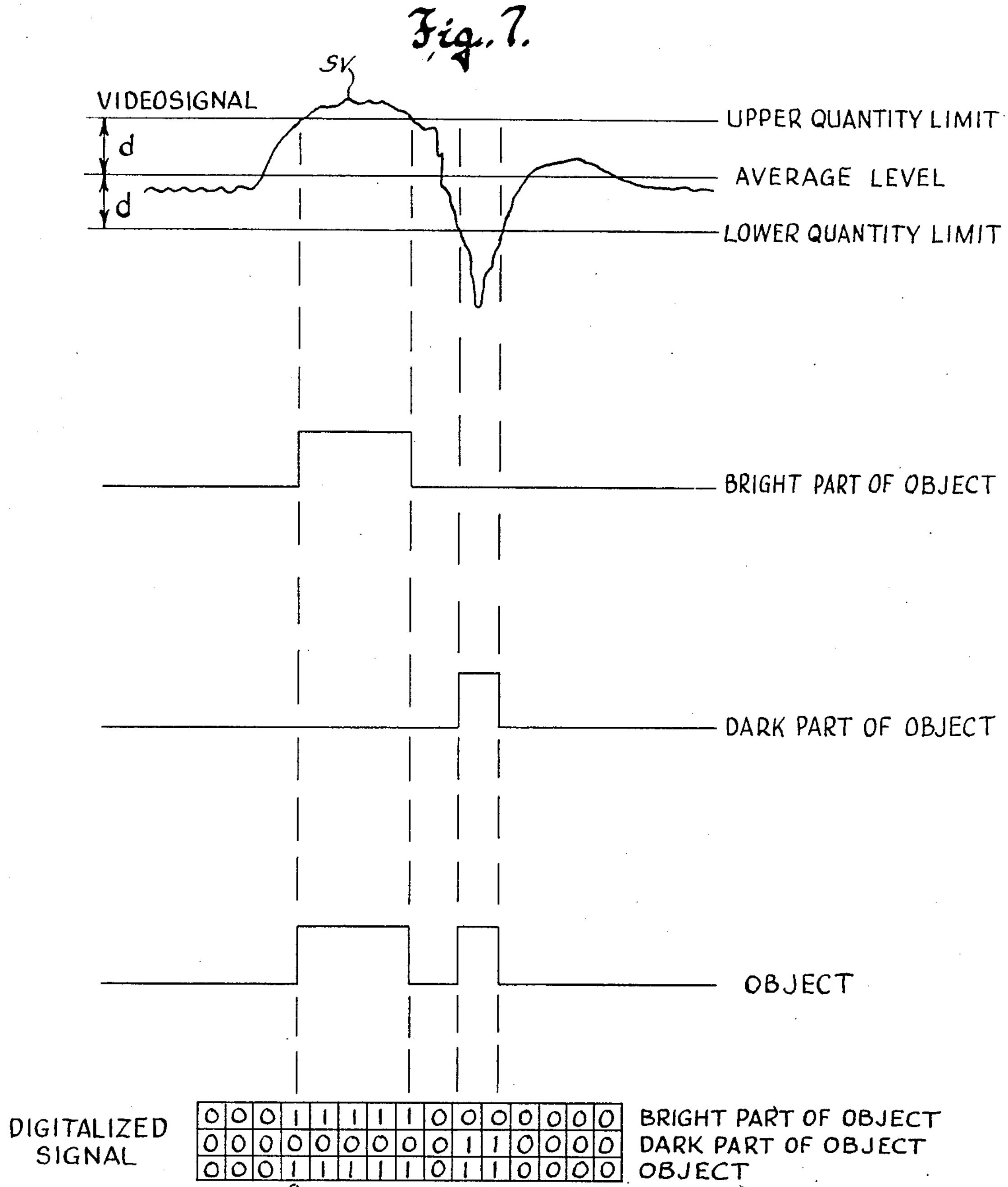
Figure 8:
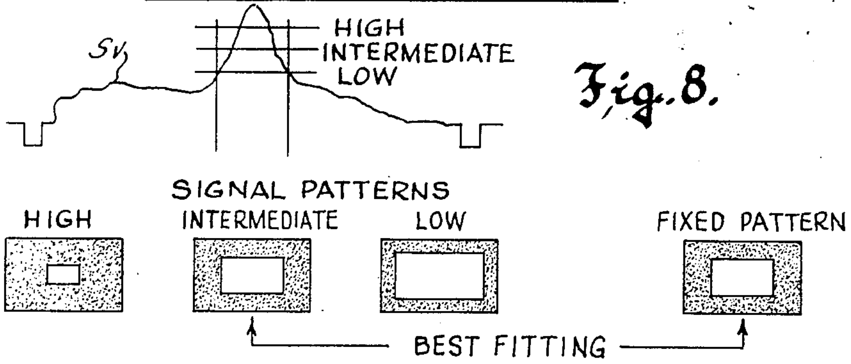

FIG. **3*a* is a still more detailed block diagram of the correlator or scanner and comparator unit of the apparatus shown in FIG. 1**, depicting an embodiment thereof that employs a reference pattern of three-by-three video elements;

FIG. **3*b* is a block diagram corresponding generally to FIG. 3*a***, but depicting a modification of the apparatus therein shown that would be used with a reference pattern of five-by-five video elements;

FIG. **3*c* is a block diagram of apparatus which complements that of either FIG. 3*a* or FIG. 3*b***;

FIG. **3*d* is a block diagram which depicts a further modification of the apparatus shown in FIG. 3*b***;

FIG. 4 is a composite diagram illustrating in its upper drawing the unprocessed or raw image which appears on an image screen, in a selected electronic window area thereof; and in its middle drawing the electronic equivalent of that image after treatment of the signal in accordance with the principles of this invention; and in its lower drawings examples of preselected reference patterns that are applied to the electronic equivalent image shown in the middle drawing;

FIG. 5 is a line graph of the video signal corresponding to the end portion of one frame and the beginning portion of the next one;

FIG. 6 illustrates a coordinate system for the location of an electronic window in the method and apparatus of this invention, only the calculation of the vertical position of the window being illustrated;

FIG. 7 illustrates diagrammatically the method of filtering and discriminating video signals in accordance with the method and apparatus of this invention in order to prepare them for further treatment in the image analysis apparatus; and FIG. 8 illustrates diagrammatically a modified method of filtering and discriminating video signals, employed for tracking certain types of targets.

Referring now more particularly to the accompanying drawings, the numeral 1 designates generally a sensor, which can be a television camera that scans at the ITV standard rate of 625 lines per frame, 25 frames per sec., and which produces a video signal that can be fed to a receiver, designated by the block 2, that converts the signals to a visible picture or image. At least certain portions of the video signal from the sensor 1 are simultaneously forwarded to an analog-to-digital (A/D) converter, designated by block 3, in which the analog video signal from the sensor is converted into digital information bits (i.e. ones and zeros).

It would be impractical to process the signal corresponding to the entire field of view embraced by the sensor 1, since much of that signal contains information not needed for tracking; therefore the signal for only a small selected portion of that field is analyzed, which selected portion constitutes an electronic window. The window is defined, as to its location on the raster, by an electronic window generator 4, comprising means synchronized to the conventional line sync pulses and producing additional pulses of higher frequency. Such higher frequency clock pulses are used, as hereinafter described, not only for defining the location of the window within the raster, but also for digitizing the video signal portions for the window area and for defining the location within the window of the object to be tracked. (More accurately it is the signal content signifying the image of the object being tracked that is of immediate interest, but here, and is subsequent discussion, the signal content and the image can be regarded as equivalent to one another and to the object.) The size of the window should be large enough so that the object does not move out of it during the time between scanning of successive frames by the sensor 1, but it should not be so large that the tracker might lock over onto some other detail within the window area. An instrumentality designated by 4*a* produces a visible indication on a monitor screen that denotes the location of the window.

Still speaking generally and with reference to FIG. 1, the video signal for each scan line is in effect broken up into a number of signal segments of uniform length, which can be regarded as connoting stations or data points along the scan line, and the video signal content for each data point, in digitized form, is fed into a memory matrix 5. The apparatus also holds, in a more or less permanent memory, a predetermined image pattern which is known or assumed to correspond rather closely to the image of the object to be tracked and which thus corresponds to a matrix of digitized information, the pattern matrix being of course substantially smaller than that of the window. By means of a correlator or scanner and comparator unit 6, the digitized video signal information for the window is compared with that of the pattern, the data points in the window being taken in sets, set-by-set sequentially, across and down the window; and for each such comparison a correlation number is obtained. Each set of data points of the window of course has the same shape and size as the pattern, and the correlation number represents the ratio between data points of the window and those of the pattern at which like bits are found, the denominator of the ratio being unexpressed inasmuch as it is a constant for any given pattern.

The location and value of the window set giving the highest such correlation number obtained in the course of a complete sequence is stored temporarily in another memory unit 7*a*–7*b*, since it is assumed that such highest correlation number designates the object being tracked.

To explain in more detail and by way of an example, assume that the electronic window has a horizontal width of 10 data points and a height of 10 lines, or in other words $10 \times 10$ data points, and that the predetermined pattern is $3 \times 3$ data points, all digital ones. There are 64 stations in the window at which meaningful comparisons can be made between the pattern and the image in the window ($8 \times 8$, since the window is $10 \times 10$ and the pattern is $3 \times 3$). If at a given comparison station the $3 \times 3$ set of data points in the window contains five ones and four zeroes, the correlation number is 5. The highest possible correlation number would be 9, the lowest would be zero.

As correlation numbers are taken, the value and location of the highest correlation number obtained "to date" is retained in the memory unit 7*a*–7*b*, and the location of the window station giving the highest correlation number for the complete comparison sequence denotes the position of the target.

Depending upon the system of scan line interlacing employed in the electro-optical sensor system, a complete comparison sequence may occupy either a half frame or a full frame. To avoid complications involving temporary storage of signal information, vertically adjacent data points should be those on lines which are scanned in succession, as distinguished from lines which appear in succession on the complete raster; hence a half-frame comparison sequence is preferred for the standard 625-line ITV system.

The location of the highest correlation number is fed to a recorder 8 which in turn issues a signal to a sensor realigning means 9 that can so control sensor positioning servos as to swing the sensor to a position in which the target or object to be tracked is aligned with the sensor axis. From the memory unit 7*a*–7*b* there can also be a feedback 13 to the electronic window generator by which the window location can be moved relative to the raster to maintain the object centered in the window.

A unit denoted by block 6*a* permits alternative comparison patterns to be fed into the apparatus, by way of comparison instructions, to provide for accurate tracking upon targets of various configurations.

Where there is a substantial amount of clutter or background within the window area, it is conceivable that two or more stations within the window may be found to yield equal high correlation numbers during the course of a comparison sequence. In that case it is most probable that the one of such stations that is nearest the center of the window corresponds to the object to be tracked. To provide for selection of the probable target under these conditions, a unit 10 is associated with the correlator unit 6 to weight the correlation numbers in accordance with their distance from the center of the window. In effect, the position-dependent weighting instrumentality 10 multiplies each correlation number by a weighting factor, the magnitude of which increases with increasing nearness to the center of the window.

FIG. 7 depicts generally the operation of the A/D converter 3. The portions of the signal that are of interest are those that lie within the limits of the window, and hence only those portions are fed to the converter 3. The incoming analogue video signal *sv* has a magnitude that varies with the brightness or darkness of the image, and the A/D converter comprises filter means for defining a limit value or limit values, and for assigning one binary value to any portion of the analogue signal that is above such limit value or outside such limit values and assigning the other binary value to the remainder of the analogue signal.

In the present case, such assignment of binary values is based on the fact that the magnitude of the analogue video signal *sv* varies both above and below a reference level designated in FIG. 7 by "average level". As a first step toward digitizing the signal, it is necessary to establish a range of signal magnitudes which extends equal magnitudes *d* to opposite sides of the average level. Thus the range is defined by an upper quantity limit and a lower quantity limit, each differing from the average level by the magnitude *d*. Then the signal portions which lie within that range must be separated from those that lie outside it. Either before or after such separation, the signal for each scanned line must be broken up into shorter signal segments, or samples, each corresponding to one of the line segments or data points in the window, as explained above. In the present case, such breaking up of the video signal is effected as the filtered video signal is fed into the buffer memory 5. Any signal sample that is either above the upper quantity limit or below the lower quantity limit (i.e., outside the predetermined magnitude range) is assigned the digital value "one". Those signal samples that lie within the quantity limits are assigned the value "zero".

The frequency at which signal segments are produced in the course of each horizontal scan line is preferably such that the data point intervals along scan lines are of the same order of magnitude as the intervals between scan lines, to provide approximately equal geometrical resolutions horizontally and vertically. For a standard ITV camera system with a 5 MHz band width the data point frequency can be on the order of 10 MHz, for optimum accuracy, in agreement with the sampling theorem. However, satisfactory results have been obtained with prototype equipment which, for simplicity, was constructed to operate with a half-frame comparison sequence and a data point frequency of about 4 MHz.

The value of the magnitude *d* is preferably adjusted in accordance with the highest prevailing correlation number for each comparison sequence, to achieve optimum sensitivity and discrimination, as indicated by the feedback 11 from the "highest correlation number" memory 7*a* to the A/D converter 3. Thus, if the maximum possible correlation number is 9, then the magnitude of *d* is so varied as to tend to maintain the highest correlation number at 7. Hence, *d* is increased in small progressive increments whenever the highest correlation number exceeds 7, and is similarly diminished whenever the highest correlation number is less than 7. The time constant in this iterative process of changing the value of *d* is a relatively large one, extending over several comparison sequences, so that random or transient disturbances will not interfere with tracking.

Figure 2:
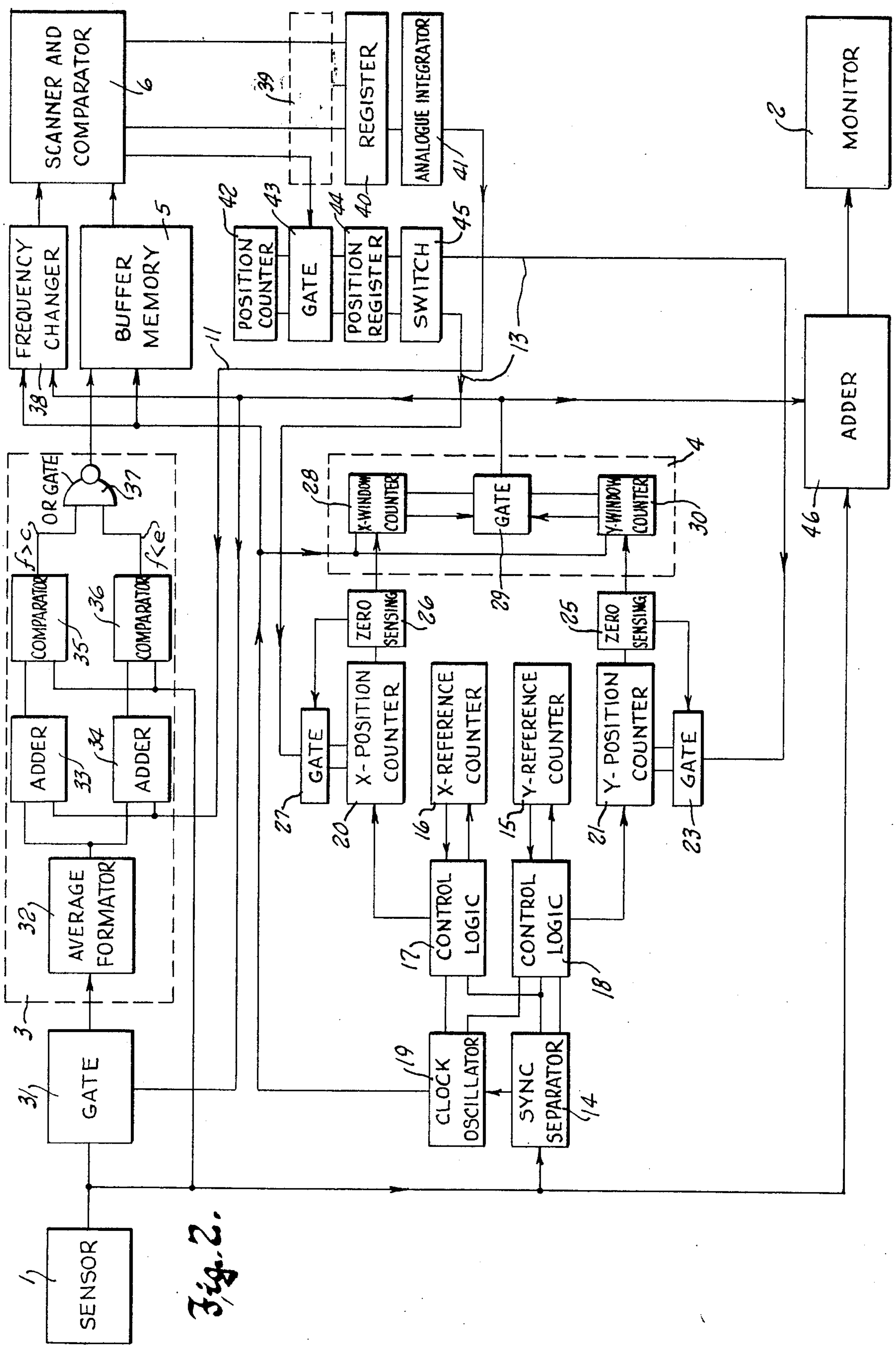
FIG. 2 is a more detailed block diagram of the apparatus shown in FIG. 1.

Considering the apparatus now in more detail, and with reference to FIG. 2, the signals from the sensor 1 are fed to a sync separator 14, which issues to control logic circuits 17 and 18 only the sync pulse portions of those signals. The sync pulses are also fed to a clock oscillator 19 which is synchronized to them. The clock 19 oscillates at the data point frequency discussed above, and is started at the beginning of each raster line by a sync pulse.

The logic circuit 17 controls a pair of *x* coordinate counters 16 and 20; the logic circuit 18 similarly controls a pair of *y* coordinate counters 15 and 21.

The operation of the *x* coordinate counters 16 and 20 is generally similar to that of the *y* coordinate counters 15 and 21, except that the latter generally respond to sync pulses while the *x* coordinate counters respond to pulses of the data point frequency from the clock oscillator 19. The counters cooperate to establish an *x–y* coordinate system and to control the origin point of the window, which is taken as its upper left-hand corner. The origin point of the *x–y* coordinate system is of course the start (left end) of the first scan line of a sequence (frame or half-frame, as the case may be). The unit of length along the *y* axis is thus two successively scanned lines, corresponding to the interval between two successive line sync pulses; and the unit of length along the *x* axis is of course given by the distance between two successive data points along a scan line, corresponding to the interval between two successive clock pulses.

The *x* counter 16 is a reference counter which counts clock pulses. It is of a type that counts pulses up to a predetermined number, and then, upon receiving the last such pulse, resets itself to zero, issuing a signal upon such zero passage. Under control of the guiding logic 17, the train of clock pulses to the *x* reference counter 16 is terminated or cut off from it when that counter goes to zero; but the counter is caused to resume counting clock pulses at the beginning of the next line, in response to the sync pulse for said next line.

The *x* counter 20 is an *x* position counter which likewise counts clock pulses and is a recycling counter that counts from zero to a predetermined number and then goes back to zero upon receipt of the next pulse following that number of pulses, issuing a signal when it goes to the zero state. Since horizontal resolution is about equal to vertical resolution, and since the left hand edge of the window will normally be spaced some distance from the right hand edge of the raster, the *x* position counter 20 and the *x* reference counter 16 can both have a counting capacity equal to somewhat less than the number of lines in a half frame, and their counting capacities should be equal. In the preferred case each can count 256 pulses. The two *x* counters cooperate, as will now be described, to function as a memory unit which contains information as to the location of the left-hand edge of the window.

During each line the *x* reference counter is stepped forward with each clock pulse, starting from the line sync pulse, and thus the count that the *x* reference counter holds at any given instant corresponds to a distance along the line from its left-hand end. To define the left-hand edge of the window a signal must be issued when the number contained by the *x* reference counter corresponds to the left-hand edge of the window. In this case it is preferred that such a signal be issued in consequence of zero passage of the *x* position counter, which operates with a phase difference from the *x* reference counter, that is, the *x* position counter goes through zero a certain number of pulses after the *x* reference counter begins each of its counting cycles. A gating circuit in the logic unit 17 prevents clock pulses from reaching both of the *x* counters when the *x* reference counter is in its waiting zero state, thus insuring that undesired phase differences cannot develop between the counters 16 and 20. To change the horizontal location of the window from frame to frame, one or more pulses can be fed to, or inhibited from reaching only the *x* position counter, at some point in its cycle, thus changing the phase relationship between the counters 16 and 20. This is preferably accomplished as the $x$ position counter goes through zero and during blanking between frames (half-frames), by means of a sensing circuit 26, which detects the zero passage of the $x$ position counter, in cooperation with a gate 27.

At zero passage of the $x$ position counter, which denotes the left-hand edge of the window, its zero passage output signal causes a counter 28 to be started. Since the width of the window is always a fixed number of data points ( =clock pulses), the $x$ location-within-the-window counter 28 establishes the right-hand edge of the window. The counter 28 is connected with the $x$ position counter through the zero sensing circuit 26.

The $y$ reference counter 15 and the $y$ position counter 21 operate in a manner generally similar to the corresponding $x$ counters, except that they respond to the line sync pulses themselves. Their operation illustrated by FIG. 6, from which the calculation of the position of the left-hand edge of the window by means of the $x$ counters will also be evident. It will be evident that it would be undesirable to change the phase difference of the $y$ position counter 21 relative to the $y$ reference counter 15 during the actual scanning of a frame (half frame) if such phase difference adjustment is to occur at zero passage of the $y$ position counter (as is preferred, owing to the nature of the counters) since such zero passage marks the upper edge of the window. Therefore such adjustment is preferably accomplished when the sweep resets (i.e., during blanking), by applying a train of pulses from the clock oscillator 19 to the $y$ counters to run the $y$ reference counter quickly through a full cycle and likewise run the $y$ position counter through a cycle plus or minus the number of pulses required for adjustment of the vertical window position. Resetting of the $x$ position counter can also be effected at that time.

The zero passage signals from the $y$ position counter 21 are led through a zero passage sensing circuit 25 to a counter 30 that establishes the height of the window. It will be seen that the units 17–30 described above correspond generally to block 4 in FIG. 1.

The signals from the window counters 28 and 30 are led to a gate 29, which in turn controls a gate 31 and an adder 46. In order to furnish a visible definition of the window within the imaged field of view, the signals corresponding to the window and those corresponding to the rest of the field of view are summed up in the adder 46 and passed on to the monitor to generate a gray window area on the monitor screen. The adder 46, in cooperation with gate 29, correspond to block 4*a* in FIG. 1.

The gate 31 is connected with the gate 29 to pass to the A/D converter 3 only those portions of the video signal that are within the window. The A/D converter comprises an average or gray-level formator 32, adders 33 and 34, comparison units 35 and 36, and an OR-gate 37. The gray level formator 32 produces an output signal $a$ that corresponds to the average or mean level of the incoming video signal within the window, and which thus represents a "gray level" corresponding to the "average level" line in FIG. 7. The threshold level magnitude $d$ is added to this gray level in the adder 33 and subtracted from it in the adder 34, so that the output of the former corresponds to the "upper quantity limit" line in FIG. 7 and that of the latter corresponds to the "lower quantity limit" line. The outputs $c$ and $e$ of adders 33 and 34 respectively are compared with the incoming video signal in the comparison units 35 and 36, and the results ($f>c$ and $f<e$) are fed to the OR-gate 37 which thus passes a digitized video signal, as explained above in the generalized description of block 3, FIG. 1.

This digitized video signal is passed on to the buffer memory 5, where a number of lines of window video elements are temporarily stored, and from that memory unit it is fed on to the correlator or scanner and comparator unit 6. The unit 6 is under the control of a frequency changer 38, which steps it forward at a rate slower than the pulse rate of the incoming signals to the buffer memory 5. The unit 6 can of course operate at this reduced rate because only a relatively small part of the video signal for each frame is processed through it.

The correlation numbers obtained in the correlation unit 6 are compared in a digital comparator 39 with the content of a register 40 in which the "so far highest" correlation number is stored, and which corresponds to the memory block 7*a* depicted in FIG. 1. If an incoming number is found to be higher than the existing content of the register 40, the new, higher number will of course enter that register to replace the old one. From the register 40 there is a feedback 11, via an analogue integrator 41, to the adders 33 and 34 of the A/D converter 3, for adjustment of the magnitude $d$ as described above.

It might be mentioned at this point that when the fixed pattern being compared in the correlator does not consist entirely of like binary units (all "ones" or all "zeros") the filtering of the video signal for digitizing it is preferably performed slightly differently than as above described. As illustrated in FIG. 8, the incoming video signal $sv$ is passed through three filters, one of which passes signal portions of only the highest level, the second of which passes all signal portions above an intermediate level, and the third of which passes all signal portions above a low level. The three filtered signals are separately digitized, essentially as described above, and are individually compared with the fixed reference pattern to obtain a highest correlation number for each. Ordinarily all three digitized signals will have their highest correlation numbers at the same location, but normally, of course, the values of those highest correlation numbers will differ. If the digitized signal that has been passed through the intermediate level filter does not have a higher highest correlation number than the signals passed through the other two filters, the level of all three filters is uniformly adjusted either upwardly or downwardly to make it so. In other words, the level of the three filters is adjusted as necessary to maintain the highest correlation number of the digitized signal passed through the intermediate level filter higher than that obtained from the digitized signals passed through either of the other two filters.

A pattern that does not consist entirely of like binary units might be needed during tracking on an object having an image of special shape and to improve target discrimination properties. As mentioned above, the block 6*a* in FIG. 1 denotes means for manually setting into the apparatus such specialized comparison patterns.

Returning now to a consideration of the correlator or scanning and comparison unit 6, not only must the "so far highest" correlation number be preserved in the register 40, but the position within the window at which that correlation number was obtained must also be stored, since this is the basis of tracking calculations. To this end a position counter 42 indicates at each moment the position in the window at which the comparison is then being performed. A gate 43 is caused to open each time a new and higher correlation number enters the register 40, and its opening connects the position counter 42 with a position register 44 which stores the location at which the new high correlation number has been obtained. The position register 44, which roughly corresponds to the position memory block 7*b* in FIG. 1, contains the *x* and *y* coordinates within the window for the high correlation number that is presumed to denote the object being tracked.

A feedback 13 from the position register 44, via a switch 45, goes to the gates 23 and 27 which control the location of the whole window, so that the window can be centered on the object being tracked. As explained above, the gates 23 and 27 control the resetting of the *x* and *y* position counters 20 and 21, respectively, and the switch 45 controls the timing of this operation, preferably to occur during resetting of the sweep, so that the position of the window will not be shifted at a time when the window itself is being generated.

The elements of the correlator 6 are illustrated in more detail in FIG. 3*a*, which illustrates an embodiment for a 3 × 3 bit pattern, all binary "ones", and a window having a width of 10 data units. Six five-bit shift registers are connected in series, so that they can, together, contain a chain of 30 consecutive data bits for the window. The first 30 data bits fed into this shift register series thus corresponds to the first three lines of data points in the window. The train of bits is stepped through the shift registers chain fashion, so that of the first 30 bits, the one in the most right hand memory cell of the shift register 48*f* (lower right in the figure) is the upper left hand data point in the window, and that in the memory cell farthest to the left in shift register 48*a* is the data point at the righthand end of the third line of the window.

As shown in FIG. 3*a* the seriesconnected shift registers can be regarded as paired, with the second or right-hand shift register of each pair having output connections from its three right hand memory cells. These output connections lead to one-bit full adders 49*a*, 49*b*, 49*c*, which are respectively connected with the shift registers 48*b* 48*d* and 48*f*. The adders 49*a* and 49*b* are connected with a two-bit full adder 50, and the latter and adder 49*c* are connected with a four-bit full adder 51. It will now be apparent that the output of the adder 51 represents the sum of the "one" bits that appear in the three right-hand memory cells in shift registers 48*b*, 48*d* and 48*f*. Inasmuch as the predetermined 3 × 3 pattern for which the FIG. 3*a* arrangement is intended consists of nine "ones", the output of the adder 51 is a correlation number.

It will now be apparent that when the first thirty data bits for a window have been stepped into the shift register chain 48*a* – 48*f*, the output of adder 51 is the correlation number for the 3 × 3 set of data points at the upper left hand corner of the window.

When the next data point bit is stepped into the shift register chain 48*a* – 48*f*, each of the bits already in that chain can be regarded as moving one step to the right, and the first bit, corresponding to the extreme upper left hand data point in the window, steps out of the shift register chain. Now the bits in the three right hand memory cells of each of shift registers 48*b*, 48*d* and 48*f* correspond to the second, third and fourth data points in each of the three first lines of the window, and the output of adder 51 is the correlation number for the second 3 × 3 set of data points in the window, one data point to the right of its left edge. Similarly, as each new bit is stepped into the shift register chain 48*a* – 48*f* from the temporary memory unit 5, a correlation number is obtained for a new set of data points across the window, until correlation numbers have been taken across the entire window.

It will be evident that after a certain number of bits have been stepped through the shift registers, the output of the adder would represent a correlation number for a data point set that is partially adjacent to the left hand edge of the window and partially adjacent to its right hand edge. Such a correlation number of course has no meaning, and therefore at such times the output from the adder 51 is blocked. It will also be evident that as successive bits are stepped through the shift register chain 48*a* – 48*f*, sets of window data points will be compared with the predetermined pattern, set-by-set stepwise, one data point per step across the window and line-by-line down it.

The correlator illustrated in FIG. 3*b* is in principle the same as that illustrated in FIG. 3*a*, but compares a 5 × 5 pattern, all binary "ones", with sets of data points in a window having a width of 10 data points. In this case 10 five-bit shift registers 53*a* – 53*e*, 54*a* – 54*e* are connected in series. Again, the series connected shift registers can be regarded as arranged in pairs, there being as many such pairs as there are lines of data points in the pattern; and in each pair the second or right-hand shift register 54*a* – 54*c* is connected, at each of its memory cells, with adders, so that the contents of all the right hand shift registers 54*a* – 54*e* can be totalled at each stepping of information bits through the shift register chain. As shown, the summation is performed by seven one-bit full adders 55*a* – 55*g*, connected with three two-bit full adders 56*a* – 56*c*, which are in turn connected with a pair of four-bit full adders 57*a* and 57*b*, connected with another four-bit full adder 58.

From either the apparatus shown in FIG. 3*a* or that shown in FIG. 3*b* the summation signal passes into the apparatus shown in FIG. 3*c*, which comprises the comparison and correlation number memory unit. The sum signals are divided, and one part is fed through an inverter 52. Each sum signal proper is fed to its proper one of a set of inverted AND-gates (NAND-gates) 62*a* – 62*e*, each comprising two AND-gates and a NOR-gate. The inverted counterpart of the sum signal, from inverter 52, is fed to a gate 61*a* – 61*d* for comparison with information stored in memory cells 60*a* – 60*e*. The memory cells, which can be electric bistable switches, have AND-gates at their inputs and have their true and inverted outputs connected with the gate elements 61*a* – 61*c*. Thus a comparison is made between the highest correlation number stored in the memory cells 60*a* – 60*e* and each sum signal as passed through the inverters 52. The results of this comparison are summed in the inverted AND-gates 62*a* – 62*e*, which are fed with the outputs of the gates 61*a* – 61*d* together with the sum signals proper.

If the results of this comparison signify a higher correlation number than is stored in the memory cells, a pulse P is issued from an AND gate 68 connected with a NAND-gate 63 that is in turn connected with the outputs of the NAND-gates 62*a* – 62*e*. This pulse signal is fed back to the AND-gates at the input sides of the memory cells 60*a* – 60*e*, to cause the new, higher correlation number to enter into those cells for storage, and at the same time the pulse P is sent to the position register 44, to cause the location at which the new high correlation number was found to be stored therein. The AND gate 68 has one input connected with the output of gate 63 and another input from gate 29, to inhibit the pulse P at times when comparisons with data point sets are meaningless.

Where the pattern to be used for comparison purposes consists of both ones and zeroes, the apparatus of FIGS. 3*a* and 3*b* must be modified as indicated in FIG. 3*d*, which depicts special connections to the shift register 54*a* in FIG. 3*b*, the connections to shift registers 54*b* – 54*e* of course being similarly modified.

As indicated in FIG. 3*d*, the shift register 54*a* has each of its memory cells connected with an inverted exclusive OR-gate 65*a* – 65*e*. The other connection to each of these inverted exclusive OR-gates is from a corresponding memory cell of a memory unit 64*a* in which is stored information concerning a line of data points of a selected pattern. The outputs of the inverted exclusive OR-gates 65*a* – 65*c* will be a binary "one" for each position at which there is agreement between the selected pattern and the bits in the shift register 54*a* (i.e., "one" to "one" or "zero" to "zero") and a binary "zero" for each position in which there is disagreement. The outputs of the inverted exclusive OR-gates 65*a* – 65*c* are fed to the adder chain 55*a* – 58, which of course sums up the results and issues a correlation number signal. It will be apparent that for arbitrarily selected pattern comparisons, a memory unit and OR-gates, corresponding to the elements 64*a* and 65*a* – 65*e* that are connected with the shift register 54*a*, will be connected, also, with each of the shift registers 54*b* – 54*e* in FIG. 3*b*, replacing the direct connections shown in that figure between the several shift registers 54*a* – 54*e* and the adders 55*a* – 55*g*.

From the foregoing description taken with the accompanying drawings it will be apparent that this invention provides a method and means for automatic video contrast tracking whereby the image of an object to be tracked is automatically compared with a preselected pattern to assure accurate tracking on the object, and whereby the level of discrimination is automatically adjusted in accordance with relative correlation between the selected pattern and the image being tracked, to insure optimum target discrimination and tracking accuracy.

We claim:

1. Method of tracking a moving object with the use of an electro-optical sensor that makes a line-by-line and frame-by-frame scan of a field of view and produces a video signal for each scanned line that has a varying magnitude along the line, and wherein such video signals are utilized to produce an output signal that corresponds to the position of an object being tracked relative to a selected point in the field of view of the sensor, which output signal can be used to maintain the axis of the sensor aligned on the object, said method being characterized by:

A. generating a timing signal which is synchronized to the beginning of each line scan and which defines a succession of time intervals of uniform duration, each substantially shorter than the time required to scan a line and thus corresponding to a segment of a scanned line;

B. by reference to the timing signal, defining a rectangular window having a height of a predetermined number of lines and a width of a predetermined number of line segments and which window is smaller than the total scanned field of view but is large enough to assure that those portions of the video signals that connote locations within the window include all information signifying the object;

C. digitizing the information in those portions of the video signals that connote locations within the window by producing, during each of said time intervals that occur during said portions of the video signals, 1. a signal information bit of one binary value when the video signal has a magnitude during the time interval that is outside a predetermined reference magnitude range, and
2. a signal information bit of the other binary value when the video signal has a magnitude during the time interval that is within said range;

D. temporarily storing the binary signal information bits produced during the scanning of a succession of lines, with the stored bits arranged in an order that is related to the location in the window that each bit connotes;

E. defining a reference pattern of binary bits that corresponds at least approximately to a digitized image of the object;

F. making a sequence of comparisons between said reference pattern and the stored signal information bits, taking the latter set by set, and for each such comparison that has meaning issuing 1. a correlation signal that signifies the ratio of agreement between the compared signal information bit set and the reference pattern, and
2. a location signal signifying the location within the window of the set being compared;

G. temporarily preserving information concerning the highest ratio correlation signal obtained for each sequence of comparisons and the location within the window connoted by the set of signal information bits for which that correlation signal was obtained; and H. producing an output signal that corresponds to the last mentioned location.

2. The method of claim 1, further characterized by:

I. changing said predetermined reference magnitude range from time to time in accordance with the highest ratio correlation signal obtained during an interval that extends through a plurality of sequences of comparisons, such change being in the direction to increase said range with increasingly high ratio correlation signals.

3. In apparatus which produces a substantially continuous signal of varying magnitude for each line of a field of view being scanned in a line-by-line, frame-by-frame sequence, means for detecting, during each sequence, those portions of said signals which correspond to a target object within the field of view that has a predetermined pattern and for thereby determining the position of that target object relative to a selected point in the field of view, said means comprising:

A. gate means to which said signals are fed and by which only those portions of said signals are passed that correspond to a selected rectangular window area within the field of view, which area is substantially smaller than the field of view but large enough to encompass the target object;

B. means connected with said gate means for digitizing the portions of said signals that pass the gate means, comprising 1. means comprising a clock oscillator for breaking each of said signal portions into a plurality of uniform length segments so that the portion of each scan line that extends across the window area comprises a predetermined number of said segments, and
2. filter means for producing a binary bit signal of one signification for each such segment having a signal magnitude that is within a predetermined range of magnitudes and for producing a binary bit signal of the other signification for each such segment having a signal magnitude lying outside said predetermined range of magnitudes;

C. a plurality of binary memory cells, there being at least as many such memory cells as there are binary data bits in a predetermined pattern of binary bit signals that corresponds to the image of the target object;

D. a plurality of serially connected shift register banks connected with said digitizing means to have binary bit signals fed therethrough sequentially, 1. there being a shift register bank for each line of data points in said pattern, and each shift register bank having a number of memory cells equal to said predetermined number of segments, and
2. certain of the memory cells of each of said shift register banks being connected in a comparison circuit with said binary memory cells so that each time a binary bit signal is fed into said shift register banks, a correlation output can be produced that corresponds to the ratio of correspondence between the contents of said certain memory cells and the contents of said binary memory cells;

E. correlation number memory means connected with said comparison circuit for storing a value corresponding to the highest ratio of correspondence for which a meaningful correlation output was produced during each sequence; and F. location memory means connected with said comparison circuit and with counter means, for storing a magnitude corresponding to the location within the window area at which said highest ratio correlation output is obtained during each sequence.

4. The apparatus of claim 3, wherein said filter means comprises:

a. average formator means to which said signals are fed and which produces an output having a magnitude that substantially corresponds to the average value of said signals;

b. first adder means connected to receive as an input the output of said average formator means and which is also connected to receive as an input an incremental signal having a predetermined augmenting magnitude, to produce an output signal corresponding to an upper level of said range of magnitudes;

c. second adder means connected to receive as an input the output of said average formator means and which is also connected to receive as an input a decremental signal having a predetermined magnitude and of sign opposite to that of the output of the average formator means, to produce an output signal corresponding to a lower level of said range of magnitudes;

d. first comparator means having an input to which the output of the first adder means is fed and having another input to which at least said portions of said substantially continuous signals are fed, and the output of which is an intermittent signal of constant magnitude corresponding to those parts of said continuous signal portions that have a magnitude which is above said range of magnitudes; and e. second comparator means having an input to which the output of the first adder means is fed and having another input to which at least said portions of said substantially continuous signals are fed, and the output of which is another intermittent signal of constant magnitude, having the same sign as the first mentioned intermittent signal, which other intermittent signal corresponds to those parts of said continuous signal portions that have a magnitude which is below said range of magnitudes.

* * * * *